Oct. 2, 1956 J. E. BLAINE, JR 2,765,236
PRESERVING OF FOODSTUFFS
Filed March 31, 1954
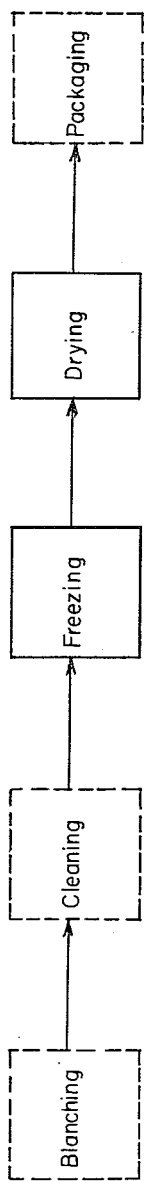
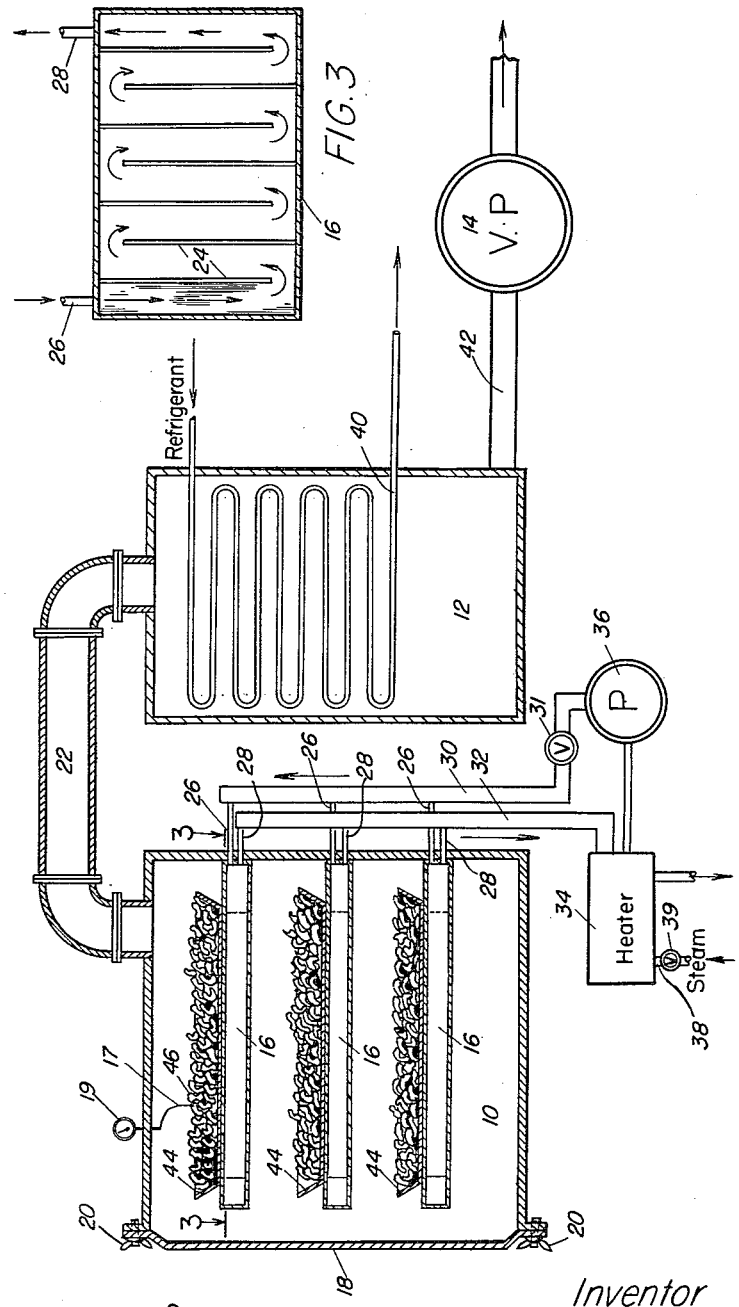
Inventor
John E. Blaine, Jr.
By his attorneys
Howson and Howson

United States Patent Office 2,765,236
Patented Oct. 2, 1956

2,765,236

PRESERVING OF FOODSTUFFS

John E. Blaine, Jr., Los Angeles, Calif., assignor to Henry P. Wager, Montclair, N. J.

Application March 31, 1954, Serial No. 420,050

4 Claims. (Cl. 99—209)

This invention relates to the preserving of foodstuffs, and particularly to a process for drying foodstuffs by sublimation, or the so-called freeze-drying technique.

One of the oldest food preserving processes known to man is drying, as used, for example, in the preservation of fruit. Drying, as it has ordinarily been practiced, however, is unsatisfactory in many ways, in particular because a foodstuff once dried by conventional techniques cannot be returned to its original state simply by adding water.

It has been suggested that this deficiency can be overcome by means of the freeze-drying technique. In freeze-drying, the food to be treated is frozen and while frozen is subjected to a very low pressure so that the water, present in the foodstuff as ice, is removed by sublimation.

Freeze-dried food can be stored for long periods of time without formation of toxic decomposition products. Prior to use, water is added to the freeze-dried product and a reconstituted food is obtained. The closeness with which the reconstituted food approaches the color and taste of the original depends on the way in which the drying is conducted, and it has been a matter of constant research by the industry to develop a technique which will give a product indistinguishable in color and taste from the original food.

Many variations of freeze-drying have been proposed. In one process, the frozen food is placed on trays which are then arranged on hollow shelves in a vacuum chamber. A high vacuum, e. g., 50 to 1000 microns of mercury, is impressed on the chamber and a heated fluid having a temperature of say 20° C. to 60° C. is circulated through the shelves. After a period of say 30 to 40 hours, the water content of the food is reduced to around 2% and it is ready for packaging. Food so dried is readily reconstituted and the product has good but not exceptional taste characteristics and color.

Moreover, while the process described gives a good product, the exceedingly long time of processing makes it uneconomical as far as foodstuffs are concerned.

To overcome these economic deficiencies, it has been proposed to operate at far higher temperatures, as for example, by using a heating medium having a temperature in excess of 100° C. By this expedient it is possible to reduce the time required to something on the order of 5 or 6 hours. However, the flavor and appearance of the reconstituted product are changed considerably.

In searching for a more economic freeze-drying technique which would at the same time preserve the appearance and taste of the food, it has now been found that by rapidly freezing a foodstuff as by quickly reducing it to a temperature between about —10° C. and —30° C., then subjecting it to a pressure of between about 1 and about 750 microns of mercury, and removing water from the foodstuff by sublimation in two stages at two separate and carefully controlled rates, it is possible to reduce the over-all processing time to about 16 to 20 hours, while obtaining even better flavor and color in the finished product than is obtained in processes taking twice as long.

According to the invention, the quick-frozen food, at a temperature between about —10° C. and —30° C. is subjected to an absolute pressure of between about 1 and about 750 microns of mercury. Under such conditions, heat of sublimation is supplied to the frozen material. The rate of heat transfer is adjusted so that in a first stage of the drying process the material loses about 60% to 90% of its moisture content over a period of from about 8 to about 12 hours.

During this period, the temperature of the food is raised from the initial —10° C. to —30° C. to between about —5° C. and about +5° C. After the water content has been decreased to between 60% and 90%, the rate of heat transfer is adjusted so that the balance of the water, except for not more than 2% retained in the finished product, is removed in a second stage of about 8 to about 12 hours duration. During this second stage, the temperature of the foodstuff is increased from the —5° C. to +5° C. it had attained at the end of the first period to between about 70° C. and about 95° C.

The water contents specified in this application are percentages by weight as determined by the Abderhalden technique, a standard procedure fully described, for example, in United States Pharmacopeia XIV.

By carefully controlling the rate at which water is removed from the foodstuff within the limits indicated, it is possible to remove the water in the minimum time, without destroying the cellular structure of the food. Surprisingly, the resulting product is superior in taste and color not only to foods dried under more rigorous conditions, but also to foods dried in longer and therefore more expensive processes. The reason for this is not clear, but it is thought that the temperatures reached in the present process serve to inactivate enzymes which have a deleterious effect on the stability of taste, although the temperatures are not high enough to cause breakdown of cell structure, formation of hard outer layers, and the like.

The term "rapid freezing" used in the present specification refers to the techniques generally employed in preparing frozen foods commercially available at the present time and means that the rate of freezing is sufficiently rapid so that the cellular structure of the food suffers minimal damage. Such freezing may be carried out by means of Dry Ice or by any other suitable known method. It is not desirable with the present invention to freeze the foodstuffs by evaporation in the vacuum chamber used to conduct the drying steps.

The exact optimum rate of freezing will vary between foodstuffs. With shrimp, as pointed out below, it is desirable to freeze at such a rate that the shrimp will go from room temperature 20–25° C. to —10° C. in not more than one hour.

The present process is applicable to many different varieties of foodstuffs such as seafood, for example, shrimp, lobsters, oysters, clams, and fish filets; meats; vegetables, for example peas and beans; fruits, such as bananas, apples, and strawberries; and coffee.

In carrying out the process of the invention, it is preferred to have the foodstuff cleaned and cooked, or blanched, before freezing. Cleaning is used to indicate both removal of dirt in the form of alien materials and the removal of shells and vapor-impermeable membranes. It is desirable to remove alien material because there is always the possibility that such material will react with the foodstuff during storage with deleterious results. It is important to remove or rupture shells, membranes or the like so that the water vapor which must be removed from the food during drying will be able to flow out freely.

Cooking or blanching is desirable because in most cases the food will be eaten in that condition, and also because such treatment serves to inactivate enzymes which would have an undesirable effect on the stability of the taste of the finished product. It will be found that generally where the foodstuff is not blanched or cooked, refrigerated storage is desirable for flavor preservation. In no case, however, will toxic materials be produced even though the food is uncooked and having been dried, is stored at room temperature or higher.

Thus, while cooking and cleaning are in many cases desirable steps, they are not essential to the invention, and whether they are resorted to will in general depend on the food being processed and the use to which it will be put.

After material has been dried according to the invention, it is preferably packaged in an inert atmosphere, for example, in nitrogen at atmospheric pressure. It has been found that such packaging is superior to packaging in air, in that upon storage in air at room temperatures oxidation processes occur which result in loss of flavor. If refrigerated storage is contemplated, nitrogen packing is not necessary. It should be clear, however, that even when packaged in air, foodstuffs processed according to the invention will not become toxic so long as they are not permitted to pick up moisture. All changes which occur will affect only the taste of the food.

For the sake of illustration, the invention will be further described in connection with the accompanying drawings in which Fig. 1 is a flow diagram of a food preserving process using the invention, optional steps being shown in dashed lines.

Fig. 2 is a schematic view of a typical freeze-drying apparatus which may be used in practicing the invention.

Fig. 3 is a horizontal sectional view of a shelf of the freeze-drying apparatus of Fig. 2.

For the purposes of illustration, the invention will be further described as applied to the freeze-drying of shrimp, it being understood that the invention is in no way restricted to shrimp.

Referring first to Fig. 1, it will be seen that a commercial process utilizing the invention may comprise five principal steps. These are:

1. Blanching (or cooking)
2. Cleaning
3. Freezing
4. Drying
5. Packaging

Steps 1, 2, and 5 may in certain cases be eliminated. For example, in the treatment of strawberries, and other fruit, blanching and to some extent, cleaning may be eliminated. In packaging cuts of meat, cleaning may be eliminated. In Fig. 1, steps 1, 2, and 5 have therefore been indicated in dashed lines.

Insofar as shrimp are concerned, all five steps are necessary.

In processing shrimp, the shrimp are removed from storage and are first blanched or cooked, preferably by contact with boiling water for a relatively brief time. The exact period will vary with the size and quality of shrimp but a convenient practice is to dump a load of shrimp into boiling water. This will, of course, kill the boil. Heating is continued and the shrimp are removed about one minute after the water resumes boiling.

The shrimp are then cleaned by first shucking, or removing the shell, head and tail, and then deveining or removing the dark-colored sand vein. In removing the sand vein, the glistening, shiny, vapor impermeable membrane covering the shrimp is ruptured, greatly facilitating removal of moisture in the drying process.

The blanched, cleaned shrimp are then put in trays and frozen, as by placing them in a freezing room held at a suitable temperature below about $-10°$ C. Preferably the freezing room will be between about $-30°$ C. and about $-40°$ C., and at a temperature such that the shrimp will reach a temperature of $-10°$ C. or lower within one hour after they have been placed in the room.

The frozen shrimp are then removed from the freezer and delivered to a drying apparatus, shown in more detail in Fig. 2.

Referring to Fig. 2, the drying apparatus comprises principally a vacuum chamber 10, a condenser 12 and a vacuum pump 14. The vacuum chamber 10 is a large box-like structure having a plurality of hollow shelves 16. It is fitted with a door 18 on one side, which is constructed to close tightly and has heavy locking elements, such as bolts 20 for preventing leakage of air into the interior when high vacuum conditions are maintained. A thermocouple 17 and suitable indicating means, such as in guage 19 are provided to maintain a check on the temperature of the food being processed.

The shelves 16 are hollow and, as may be seen more clearly from Fig. 3, are fitted with a series of baffles 24 and inlet and outlet pipes 26 and 28 respectively, to provide a serpentine path for heating liquid from one side of the shelf to the other.

The inlet pipes 26 connect to an input manifold 30, and outlet pipes 28 to an exhaust manifold 32. Both manifolds connect to a heater 34. A pump 36 is connected in input manifold 30 to provide necessary circulation of heating medium from the heater 34 through the shelves 16.

Steam may be used to operate heater 34 as indicated at 38.

As will be clear from the drawing, pump 36 draws hot water from heater 34 and forces it through manifold 30 into inlet pipes 26 whence it moves in a serpentine path inside shelves 16, heating them, and is returned to heater 34 via pipes 28 and manifold 32.

A vapor duct 22 for the withdrawal of evaporated water is located in the roof of chamber 10 and leads from the chamber to condenser 12. The condenser encloses a refrigerating coil 40 which is maintained at a temperature sufficiently low to condense as solid the vapor evaporated in chamber 10.

A duct 42 connects condenser 12 with vacuum pump 14 and permits the pump to maintain a high vacuum in chamber 10 and condenser 12.

As mentioned above, the shrimp are frozen in trays. These trays (44 in Fig. 2) laden with frozen shrimp 46 are removed from the freezer (not shown) and are placed on the shelves 16 of vacuum chamber 10. The door 18 is closed and secured, the vacuum pump 14 is started and refrigerant is caused to flow in coil 40.

When a suitable pressure has been reached, pump 36 and heater 34 are placed in operation and hot water is caused to flow through the shelves 16. A check is kept on the temperature of the shrimp by means of thermocouple 17 and gauge 19, and the heat supplied to the shrimp is regulated by regulating the rate of flow of the hot water in trays 44, as by valve 31, or by regulating the temperature of the water as by a valve 39 governing the steam supply to heater 34. The temperature of the shrimp is allowed to rise gradually but in no case is it permitted to exceed 5° C. until at least 60% of the water has been removed from the shrimp. Practice in operating a given apparatus will permit determination of a satisfactory adjustment of water temperature and rate of flow such that between about 60% and about 90% of the water is removed in the first 8 to 12 hours. In making such determination, a series of trial runs must be conducted with shrimp removed and tested for water content at intervals while varying time, water temperature, and rate of flow.

When the shrimp have lost 60% to 90% of their original moisture, the temperature of the shrimp is increased gradually so that at the end of another period of 8 to 12 hours the shrimp have reached a temperature of 70° C. to 95° C., and the water content has been reduced to not higher than 2%.

The following specific examples are given, it being intended merely as further illustration, and in no way as limiting the invention to the specific times, temperatures, or materials given therein.

*Example I*

Approximately 750 pounds of shrimp were taken from storage and were blanched by immersing in boiling water. The blanching technique described above was followed, i. e., the shrimp were immersed in the boiling water, killing the boil. After boiling had resumed, the shrimp were kept in the water for one minute and were then removed.

The shrimp were then shucked and deveined to give a weight after cleaning of 380 pounds. The shrimp were then placed in large trays, and frozen in a freezer maintained at −30° C. After the temperature of the shrimp had reached −20° C. they were transferred in the trays to a dryer similar to that shown in the Fig. 2. A vacuum was created in the dryer of 200 microns of mercury, absolute pressure. The temperature of the heating water to start was about 25° C. It was gradually raised to about 85° C. as the temperature of the shrimp rose to about 0° C. at the end of 8 hours. The water content of the shrimp at this time was determined and found to be about 12%. Drying was continued with the temperature of the water ranging from about 75° C. to about 95° C., and the temperature of the shrimp gradually increasing to about 90° C. After another 10 hours, the shrimp were removed and found to have a water content of 1.2%. The shrimp at this time weighed about 104 pounds.

Samples of the dried shrimp were soaked in cold water for about 15 minutes. They were then indistinguishable in color and flavor from freshly caught shrimp.

*Example II*

Coffee extract was processed under conditions similar to that described above for shrimp. The dried product dissolved readily in water and the result beverage had a taste superior to spray-dried coffees.

The present invention thus provides a simple method by which foodstuffs can be preserved by freeze-drying with a relatively short processing time at substantially reduced cost. The products resulting from the process are of color and flavor substantially indistinguishable from fresh products and are far superior in this respect to known processes of which I am aware.

What I claim is:

1. A method of preserving shrimp which comprises blanching said shrimp, cleaning said shrimp, rapidly freezing said shrimp and placing said shrimp under an absolute pressure of between about 1 and about 750 microns of mercury at a temperature between about −10° C. and −30° C. and supplying heat to said shrimp to dry them, said drying being conducted in two stages, each of from about 8 to about 12 hours duration; from about 60% to about 90% of the original water content of said shrimp being removed in a first stage and the remaining water being reduced in a second stage to not more than about 2% of the original water content, the temperature of said shrimp being raised in said first stage to between about −5° C. and about 5° C., and in said second stage to between about 70° C. and about 95° C.

2. A method as claimed in claim 1, in which the shrimp after drying, are packaged in an inert atmosphere.

3. A method as claimed in claim 2, in which the inert atmosphere is nitrogen.

4. The method claimed in claim 1 and comprising shucking the blanched shrimp, deveining the shucked shrimp and simultaneously rupturing the vapor-impermeable membrane left on the shrimp after shucking.

References Cited in the file of this patent

UNITED STATES PATENTS

| 2,292,447 | Irwin | Aug. 11, 1942 |
| 2,388,917 | Hormel | Nov. 13, 1945 |
| 2,509,681 | Flosdorf | May 30, 1950 |
| 2,577,704 | Flosdorf | Dec. 4, 1951 |

OTHER REFERENCES

"Food Industries," January 1945, pages 92, 93, 94, 95, 168, 170, 172, 174, 176, and 178, article entitled "Drying By Sublimation."

"Manufacturing Chemist and Manufacturing Perfumer," February 1949, pages 75, 76, and 77, article entitled "Vacuum Freeze Drying" by H. H. Chambers.